United States Patent
Sugiyama

(10) Patent No.: US 10,962,112 B2
(45) Date of Patent: Mar. 30, 2021

(54) TRANSMISSION APPARATUS

(71) Applicant: SUBARU CORPORATION, Tokyo (JP)

(72) Inventor: Kyohei Sugiyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 29 days.

(21) Appl. No.: 16/412,052

(22) Filed: May 14, 2019

(65) Prior Publication Data

US 2020/0080636 A1    Mar. 12, 2020

(30) Foreign Application Priority Data

Sep. 7, 2018   (JP) .............................. JP2018-167741

(51) Int. Cl.
*F16H 37/08*   (2006.01)
*F16H 61/662*  (2006.01)
*F16H 3/44*    (2006.01)

(52) U.S. Cl.
CPC .............. *F16H 61/662* (2013.01); *F16H 3/44* (2013.01); *F16H 2200/2005* (2013.01); *F16H 2200/2043* (2013.01)

(58) Field of Classification Search
CPC ........................ F16H 2037/0886; F16H 37/022
See application file for complete search history.

(56) References Cited

U.S. PATENT DOCUMENTS

| | | | | |
|---|---|---|---|---|
| 3,597,997 A * | 8/1971 | Phillips | .................. | F16H 47/04 |
| | | | | 475/81 |
| 5,194,052 A * | 3/1993 | Ueda | ..................... | F16H 37/086 |
| | | | | 475/66 |
| 5,453,061 A * | 9/1995 | Fellows | ................ | F16H 37/086 |
| | | | | 475/215 |
| 6,569,051 B2 * | 5/2003 | Hirano | ................ | F16H 61/6648 |
| | | | | 192/44 |
| 6,752,735 B2 * | 6/2004 | Ishikawa | ................. | F16H 15/38 |
| | | | | 475/216 |
| 6,866,606 B2 * | 3/2005 | Ooyama | ............... | F16H 37/086 |
| | | | | 475/208 |
| 6,932,739 B2 * | 8/2005 | Miyata | .................. | F16H 61/061 |
| | | | | 475/216 |

(Continued)

FOREIGN PATENT DOCUMENTS

| | | | | |
|---|---|---|---|---|
| DE | 10118363 A1 * | 10/2002 | ......... | F16H 61/0059 |
| JP | 2018-004036 A | 1/2018 | | |

(Continued)

OTHER PUBLICATIONS

Japanese Office Action, dated May 19, 2020, in Japanese Application No. 2018-167741 and English Translation thereof.

*Primary Examiner* — Sherry L Estremsky
(74) *Attorney, Agent, or Firm* — McGinn I.P. Law Group, PLLC

(57) ABSTRACT

A transmission apparatus includes a planetary gear mechanism, a first path, a second path, and a continuously variable transmission. The planetary gear mechanism has a first gear, a second gear, and a third gear. The first path is configured to transmit power from an output shaft of an engine to the first gear. The second path is configured to transmit the power from the output shaft to the second gear. The continuously variable transmission is disposed in the first path.

11 Claims, 5 Drawing Sheets

(56) References Cited

U.S. PATENT DOCUMENTS

| | | | |
|---|---|---|---|
| 9,309,970 B2* | 4/2016 | Kamiyamaguchi | F16H 15/44 |
| 10,309,506 B2* | 6/2019 | Janson | F16H 9/12 |
| 2005/0164831 A1* | 7/2005 | Wafzig | F16H 37/086 |
| | | | 477/198 |
| 2014/0155220 A1* | 6/2014 | Messier | F16H 37/022 |
| | | | 476/33 |

FOREIGN PATENT DOCUMENTS

| | | | |
|---|---|---|---|
| WO | WO 2013/175587 A1 | 11/2013 | |
| WO | WO-2013175587 A1 * | 11/2013 | F16H 37/022 |

\* cited by examiner

TRANSMISSION APPARATUS

CROSS-REFERENCE TO RELATED APPLICATIONS

The present application claims priority from Japanese Patent Application No. 2018-167741 filed on Sep. 7, 2018, the entire contents of which are hereby incorporated by reference.

BACKGROUND

The disclosure relates to a transmission apparatus.

A continuously variable transmission having a belt that is stretched over cone surfaces of two pulleys has been widely used. The width of the cone surface of the pulley may be changed by hydraulic pressure to adjust a transmission gear ratio. For instance, Japanese Unexamined Patent Application Publication No. 2018-4036 discloses a technique for improving a coefficient of friction by subjecting an outer circumferential surface of a pulley to a surface treatment.

SUMMARY

An aspect of the disclosure provides a transmission apparatus including a planetary gear mechanism, a first path, a second path, and a continuously variable transmission. The planetary gear mechanism has a first gear, a second gear, and a third gear. The first path is configured to transmit power from an output shaft of an engine to the first gear. The second path is configured to transmit the power from the output shaft to the second gear. The continuously variable transmission is disposed in the first path.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
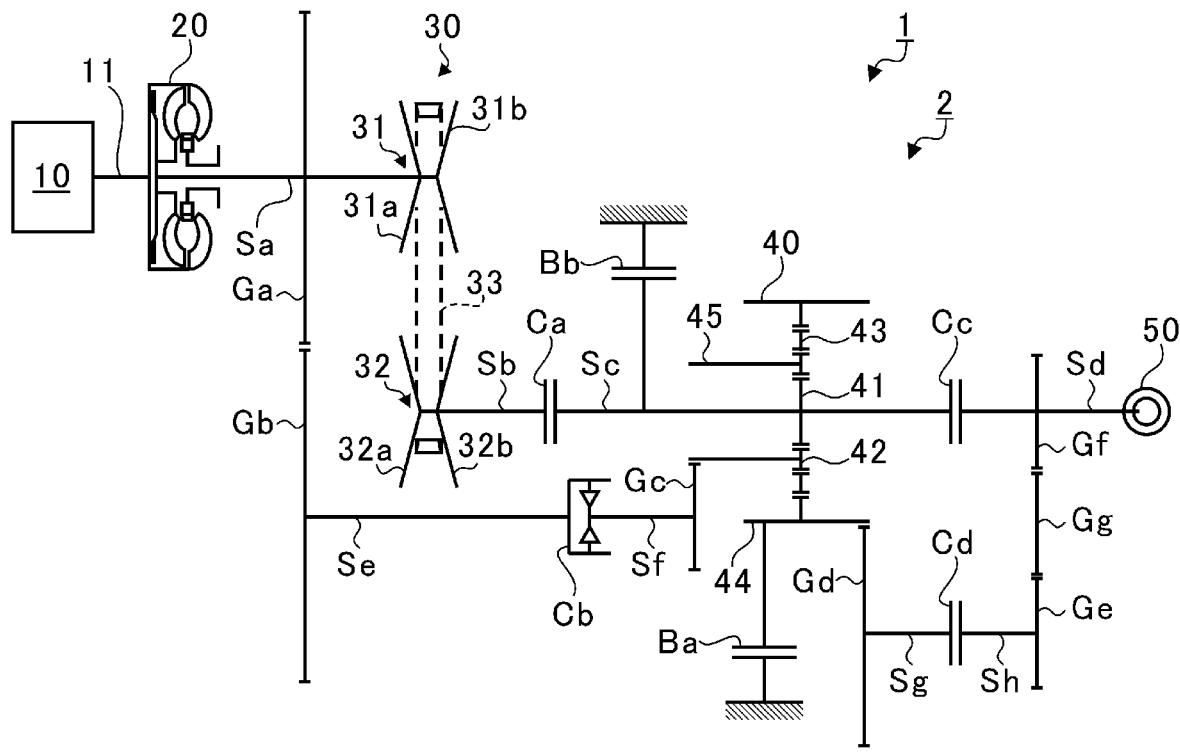
FIG. 1 illustrates a schematic configuration of a transmission apparatus of a vehicle.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. When a transmission torque is great, if a continuously variable transmission does not increase the hydraulic pressure, the belt slides on the cone surface of the pulley. Increasing the hydraulic pressure can cause power loss in a hydraulic pump or other components. Reference to a number with an element (i.e. a first element, a second element, a third element, etc.) is intended to identify a particular element and not identify a number of elements.

It is desirable to provide a transmission apparatus capable of reducing power loss.

FIG. 1 illustrates a schematic configuration of a transmission apparatus 2 of a vehicle 1. As illustrated in FIG. 1, the vehicle 1 is provided with an engine 10. The engine 10 has a combustion chamber in which explosion pressure is generated. The explosion pressure makes a piston move reciprocately, thereby rotating a crankshaft 11. In one implementation, the crankshaft 11 may serve as an "output shaft". The crankshaft 11 is coupled to a torque converter 20.

The torque converter 20 transmits the rotation power of the crankshaft 11 to a first shaft Sa via working fluid in a casing. The torque converter 20 is capable of increasing torque to be transmitted to the first shaft Sa.

A continuously variable transmission 30 includes a primary pulley 31, a secondary pulley 32, and a belt 33. The primary pulley 31 is provided to the first shaft Sa. The secondary pulley 32 is provided to a second shaft Sb that is arranged in parallel to the first shaft Sa. The belt 33 is, for instance, a chain belt having link plates coupled to each other with pins or a rubber belt.

The primary pulley 31 includes a fixed sheave 31a and a movable sheave 31b. The fixed sheave 31a and the movable sheave 31b face each other in an axial direction of the first shaft Sa. The facing surfaces of the fixed sheave 31a and the movable sheave 31b have approximately conical-shaped cone surfaces. The cone surfaces of the fixed sheave 31a and the movable sheave 31b form a groove therebetween for stretching the belt 33.

Similarly, the secondary pulley 32 includes a fixed sheave 32a and a movable sheave 32b. The fixed sheave 32a and the movable sheave 32b face each other in an axial direction of the second shaft Sb. The facing surfaces of the fixed sheave 32a and the movable sheave 32b have approximately conical-shaped cone surfaces. The cone surfaces form a groove for stretching the belt 33.

The belt 33 is stretched over the groove that is formed by the cone surfaces of the fixed sheave 31a and the movable sheave 31b of the primary pulley 31 and over the groove that is formed by the cone surfaces of the fixed sheave 32a and the movable sheave 32b of the secondary pulley 32. The belt 33 transmits power between the primary pulley 31 and the secondary pulley 32 by friction against the cone surfaces.

The movable sheave 31b moves in the axial direction of the first shaft Sa by hydraulic pressure of the hydraulic oil.

The movable sheave 32b moves in the axial direction of the second shaft Sb by the hydraulic pressure of the hydraulic oil. The facing distance between the cone surfaces of the primary pulley 31 or the secondary pulley 32 is changed to change a width of the groove for stretching the belt 33. The change in the width of the groove results in change in a winding diameter of the belt 33. Thus, the continuously variable transmission 30 is able to vary speed continuously between the first shaft Sa and the second shaft Sb.

A third shaft Sc is provided on the same axis as the second shaft Sb. A first clutch Ca is disposed between the second shaft Sb and the third shaft Sc. The first clutch Ca switches a connected state and a disconnected state of transmission of power between the second shaft Sb and the third shaft Sc (that is, a sun gear 41). The sun gear 41 will be described later. In one implementation, the sun gear 41 may serve as a "first gear".

A planetary gear mechanism 40 includes the sun gear 41, first planetary gears 42, second planetary gears 43, a ring gear 44, and a carrier 45. In one implementation, the first planetary gear 42 may serve as a "second gear", and the ring gear 44 may serve as a "third gear". That is, the planetary gear mechanism 40 is what is called a double pinion planetary gear mechanism.

The sun gear 41 has external teeth that mesh with external teeth of a plurality of the first planetary gears 42. A plurality of the second planetary gears 43 are disposed on a radially outside of the sun gear 41 on a side opposite to the first planetary gear 42. The second planetary gear 43 has external teeth that mesh with the external teeth of the first planetary gear 42 and internal teeth of the ring gear 44. The carrier 45 rotatably supports the plurality of first planetary gears 42. The rotation of the first planetary gears 42 around a center axis of the sun gear 41 synchronizes with the rotation of the carrier 45 around the center axis of the sun gear 41.

The sun gear 41 is provided to the third shaft Sc. A fourth shaft Sd is provided on the same axis as the third shaft Sc. A third clutch Cc is disposed between the third shaft Sc and the fourth shaft Sd. The third clutch Cc switches a connected state and a disconnected state of transmission of power between the third shaft Sc and the fourth shaft Sd.

The fourth shaft Sd is coupled to a wheel 50. The fourth shaft Sd may be coupled to the wheel 50 via a reduction drive, a clutch, or a differential gear. The reduction drive, the clutch, and the differential gear are not illustrated in the drawings.

A fifth shaft Se is arranged in parallel to the first shaft Sa. A gear Ga is provided to the first shaft Sa and rotates integrally with the first shaft Sa. A gear Gb is provided to the fifth shaft Se and rotates integrally with the fifth shaft Se. The gears Ga and Gb mesh with each other. The gears Ga and Gb transmit power from the first shaft Sa to the fifth shaft Se.

A sixth shaft Sf is provided on the same axis of the fifth shaft Se. A second clutch Cb is disposed between the fifth shaft Se and the sixth shaft Sf. The second clutch Cb is, for instance, a one-way clutch. The second clutch Cb transmits power from the fifth shaft Se side to the sixth shaft Sf side. The second clutch Cb cuts off transmission of power from the sixth shaft Sf side to the fifth shaft Se side.

The sixth shaft Sf is provided with a gear Gc. The gear Gc rotates integrally with the sixth shaft Sf. The carrier 45 is provided with external teeth. The gear Gc meshes with the external teeth of the carrier 45 to be coupled to the carrier 45.

The path for transmitting power from the crankshaft 11 to the sun gear 41 is a first path. The first path includes the torque converter 20, the first shaft Sa, the second shaft Sb, and a part of the third shaft Sc on the second shaft Sb side from the sun gear 41. The first path is provided with the continuously variable transmission 30 and the first clutch Ca. The first clutch Ca in the first path switches the connected state and the disconnected state of transmission of power between the crankshaft 11 and the sun gear 41.

Also, a path for transmitting power from the crankshaft 11 to the first planetary gear 42 is a second path. The second path includes the torque converter 20, the first shaft Sa, the gears Ga and Gb, the fifth shaft Se, and the gear Gc. The second path is provided with the second clutch Cb. The second clutch Cb in the second path cuts off transmission of the power from the first planetary gear 42 side to the crankshaft 11 side.

The ring gear 44 is coupled to a first brake Ba. The first brake Ba includes, for instance, a clutch. The first brake Ba is provided between the ring gear 44 and a non-rotation member, such as a housing. The first brake Ba switches a connected state and a disconnected state of transmission of power between the ring gear 44 and the non-rotation member. The first brake Ba stops the rotation of the sun gear 41 when connecting the ring gear 44 and the non-rotation member.

A part of the third shaft Sc between the first clutch Ca and the sun gear 41 is coupled to a second brake Bb. The second brake Bb includes, for instance, a clutch. The second brake Bb is provided between the third shaft Sc and a non-rotation member such as a housing. The second brake Bb switches a connected state and a disconnected state of transmission of power between the third shaft Sc and the non-rotation member. The second brake Bb stops the rotation of the sun gear 41 via the third shaft Sc when connecting the third shaft Sc and the non-rotation member.

The ring gear 44 is provided with external teeth. The gear Gd meshes with the external teeth of the ring gear 44 to be coupled to the ring gear 44. The gear Gd is provided to a seventh shaft Sg. The seventh shaft Sg is arranged in parallel to the third shaft Sc. An eighth shaft Sh is provided on the same axis as the seventh shaft Sg. A fourth clutch Cd is disposed between the seventh shaft Sg and the eighth shaft Sh. The fourth clutch Cd switches a connected state and a disconnected state of transmission of power between the seventh shaft Sg and the eighth shaft Sh.

The eighth shaft Sh is provided with a gear Ge. The gear Ge is provided to the eighth shaft Sh and rotates integrally with the eighth shaft Sh. The fourth shaft Sd is provided with a gear Gf. The gear Gf is provided to the fourth shaft Sd and rotates integrally with the fourth shaft Sd. A gear Gg is provided between the gears Ge and Gf. The gears Ge and Gg mesh with each other, and the gears Gg and Gf mesh with each other. The third shaft Sc and the eighth shaft Sh are coupled to each other by the gears Ge, Gf, and Gg.

A path for transmitting power from the sun gear 41 to the wheel 50 is a third path. The third path includes (i) a part of the third shaft Sc on the wheel 50 side from the sun gear 41 and (ii) the fourth shaft Sd. The third clutch Cc is provided in the third path.

A path for transmitting power from the ring gear 44 to the wheel 50 is a fourth path. The fourth path includes the gear Gd, the seventh shaft Sg, the eighth shaft Sh, the gears Ge, Gg, and Gf, and a part of the fourth shaft Sd on the wheel 50 side from the gear Gf. The fourth clutch Cd is provided in the fourth path.

The power that is transmitted through the fourth path from the ring gear 44 side to the wheel 50 is in a rotation direction reverse to a rotation direction of power that is transmitted through the third path from the sun gear 41 side to the wheel 50.

Figure 2:
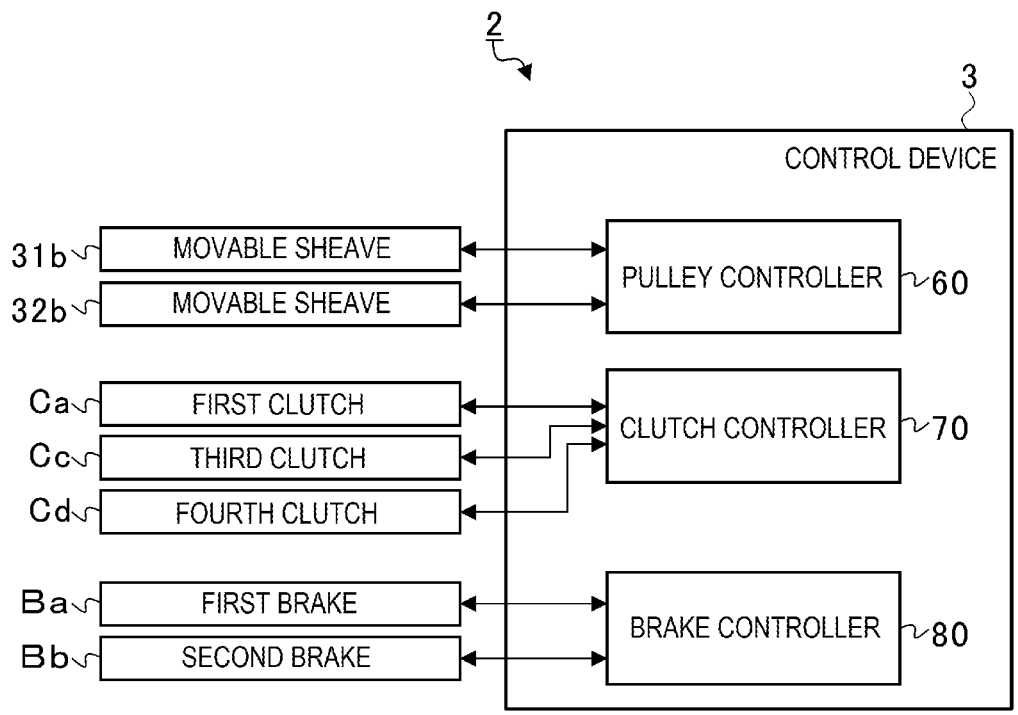
FIG. 2 is a functional block diagram illustrating a control system of the transmission apparatus.

FIG. 2 is a functional block diagram illustrating a control system of the transmission apparatus 2. As illustrated in FIG. 2, the transmission apparatus 2 includes a control device 3. The control device 3 includes, for instance, a computer, such as an engine control unit (ECU). The control device 3 includes components such as a semiconductor integrated circuit. The semiconductor integrated circuit has elements such as a central processing unit (CPU), a ROM storing programs, and a RAM serving as a work area. The control device 3 also functions as a pulley controller 60, a clutch controller 70, and a brake controller 80.

The pulley controller 60 controls hydraulic pressure of hydraulic oil supplied from a hydraulic pump to the movable sheaves 31b and 32b by opening and closing a hydraulic control valve or another component, which is not illustrated in the drawings. The pulley controller 60 changes the facing distance between the cone surfaces of the primary pulley 31 or the facing distance between the cone surfaces of the secondary pulley 32 or both, thereby continuously changing a transmission gear ratio between the first shaft Sa and the second shaft Sb, as described above. The transmission gear ratio is, for instance, determined by the number of engine revolutions, a vehicle speed, or other factors.

The clutch controller 70 controls hydraulic pressure of hydraulic oil supplied from a hydraulic pump to each clutch hydraulic actuator by opening and closing a hydraulic control valve or another component, which is not illustrated in the drawings. The clutch hydraulic actuator is provided to each of the first clutch Ca, the third clutch Cc, and the fourth clutch Cd. The clutch hydraulic actuators respectively operate the first clutch Ca, the third clutch Cc, and the fourth clutch Cd. The clutch controller 70 maintains the connected state and the disconnected state of the first clutch Ca, the third clutch Cc, and the fourth clutch Cd, in a manner independent of each other. The clutch controller 70 is also able to maintain what is called a half-clutch state of each of the first clutch Ca, the third clutch Cc, and the fourth clutch Cd.

The brake controller 80 controls hydraulic pressure of hydraulic oil supplied from a hydraulic pump to each brake hydraulic actuator by opening and closing a hydraulic control valve or another component, which is not illustrated in the drawings. The brake hydraulic actuator is provided to each of the first brake Ba and the second brake Bb. The brake hydraulic actuators operate the first brake Ba and the second brake Bb. The brake controller 80 maintains the connected state and the disconnected state of each of the first brake Ba and the second brake Bb in a manner independent of each other. The brake controller 80 is also able to maintain what is called a half-clutch state of each of the first brake Ba and the second brake Bb.

Figure 3:
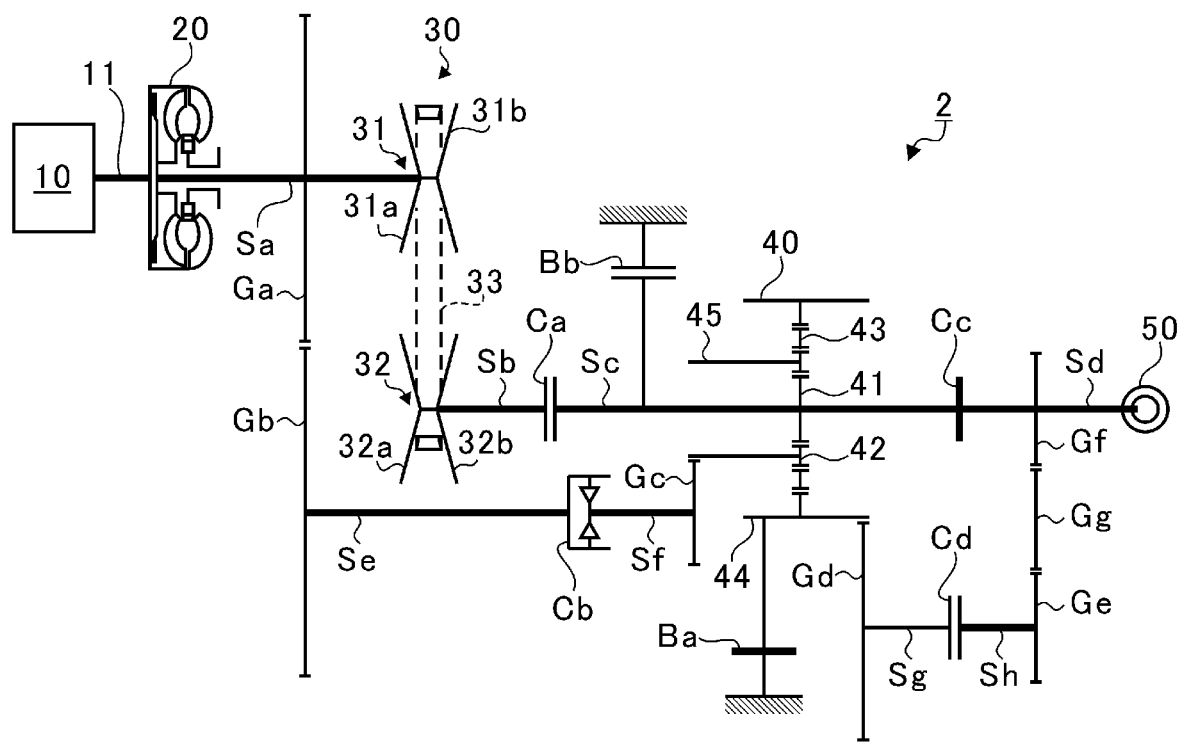
FIG. 3 is a diagram illustrating the transmission apparatus at a start of traveling of the vehicle.

FIG. 3 is a diagram illustrating the transmission apparatus 2 at a start of traveling of the vehicle 1. FIGS. 3 to 5 and 9 illustrate a shaft in a rotating state by a line bolder than a line indicating a shaft in a stopping state. As illustrated in FIG. 3, at the start of traveling of the vehicle 1, the clutch controller 70 makes the first clutch Ca and the fourth clutch Cd in the disconnected state and makes the third clutch Cc in the connected state. The brake controller 80 makes the first brake Ba in the connected state and makes the second brake Bb in the disconnected state.

The power of the first shaft Sa is transmitted through the second path to the carrier 45 and the first planetary gear 42. The second path passes the torque converter 20, the first shaft Sa, the gears Ga and Gb, the fifth shaft Se, and the gear Gc.

At this time, the rotation of the ring gear 44 is stopped because the first brake Ba is in the connected state. Thus, the power that is transmitted to the first planetary gear 42 is transmitted to the third shaft Sc via the sun gear 41.

The third clutch Cc in the connected state transmits the power from the third shaft Sc to the wheel 50 via the fourth shaft Sd in the third path. On the other hand, the power of the first shaft Sa is also transmitted to the second shaft Sb via the continuously variable transmission 30. This generates a differential rotation between the second shaft Sb and the third shaft Sc, but this causes no problem because the first clutch Ca is in the disconnected state.

The power of the fourth shaft Sd is transmitted to the eighth shaft Sh via the gears Gf, Gg, and Ge. However, the power is not transmitted from the eighth shaft Sh to the seventh shaft Sg because the fourth clutch Cd is in the disconnected state.

In these conditions, the transmission apparatus 2 has a fixed transmission gear ratio. The state of the transmission apparatus 2 as illustrated in FIG. 3 is hereinafter called a "transmission gear ratio fixed state". The transmission gear ratio in the transmission gear ratio fixed state corresponds to, for instance, a first speed of a traditional transmission.

Figure 4:
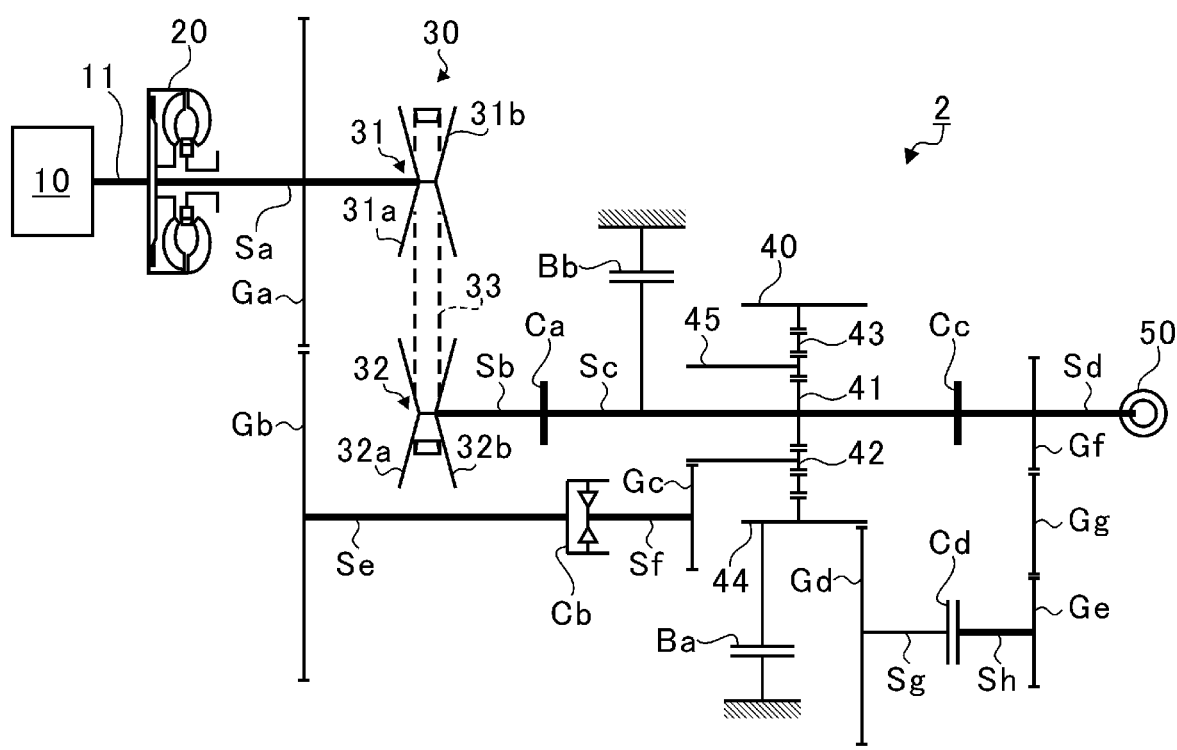
FIG. 4 is a diagram illustrating the transmission apparatus when a vehicle speed of the vehicle is stable.

FIG. 4 is a diagram illustrating the transmission apparatus 2 when a vehicle speed of the vehicle 1 is stable. As illustrated in FIG. 4, when the vehicle speed of the vehicle 1 is stable, for instance, when the vehicle speed exceeds a predetermined speed, the clutch controller 70 makes the fourth clutch Cd in the disconnected state and makes the first clutch Ca and the third clutch Cc in the connected states. The brake controller 80 makes the first brake Ba and the second brake Bb in the disconnected states. FIG. 4 illustrates a state that is different from the transmission gear ratio fixed state in that the first clutch Ca is in the connected state and the first brake Ba is in the disconnected state.

The power of the first shaft Sa is transmitted through the first path, namely, the torque converter 20, the first shaft Sa, the second shaft Sb, and the third shaft Sc. The third clutch Cc in the connected state transmits the power from the third shaft Sc to the wheel 50 via the fourth shaft Sd in the third path.

The power of the first shaft Sa is also transmitted to the carrier 45 via the gears Ga and Gb, the fifth shaft Se, the second clutch Cb, and the sixth shaft Sf. However, the first brake Ba in the disconnected state does not inhibit rotation of the ring gear 44. Thus, the power that is transmitted to the carrier 45 causes the first planetary gear 42 to only idle and is not transmitted to the sun gear 41. As a result, the power is not transmitted between the third shaft Sc and the sixth shaft Sf or between the sun gear 41 and the carrier 45.

The power of the fourth shaft Sd is transmitted to the eighth shaft Sh via the gears Gf, Gg, and Ge. However, the power is not transmitted from the eighth shaft Sh to the seventh shaft Sg because the fourth clutch Cd is in the disconnected state.

In these conditions, the transmission apparatus 2 has a transmission gear ratio that is determined by the continuously variable transmission 30. The state of the transmission apparatus 2 as illustrated in FIG. 4 is hereinafter called a "pulley based speed varying state". The transmission gear ratio in the pulley based speed varying state is varied by control of the pulley controller 60. The pulley controller 60 controls the movable sheaves 31b and 32b so as to obtain an optimal transmission gear ratio, in accordance with an engine speed, a vehicle speed, and other factors.

When a transmission torque is great, such as at the time the vehicle 1 starts traveling, if the continuously variable transmission 30 does not increase the hydraulic pressure to be applied to the movable sheaves 31b and 32b, the belt 33 slides on the cone surfaces. In view of this, the transmission apparatus 2 is controlled to be in the transmission gear ratio fixed state as illustrated in FIG. 3 at the time the vehicle 1 starts traveling. As a result, the continuously variable transmission 30 does not substantially transmit the power, and therefore, there is no need to increase the hydraulic pressure. That is, an increase in power loss at the hydraulic pump or another component is avoided, thereby reducing the power loss.

Figure 5:
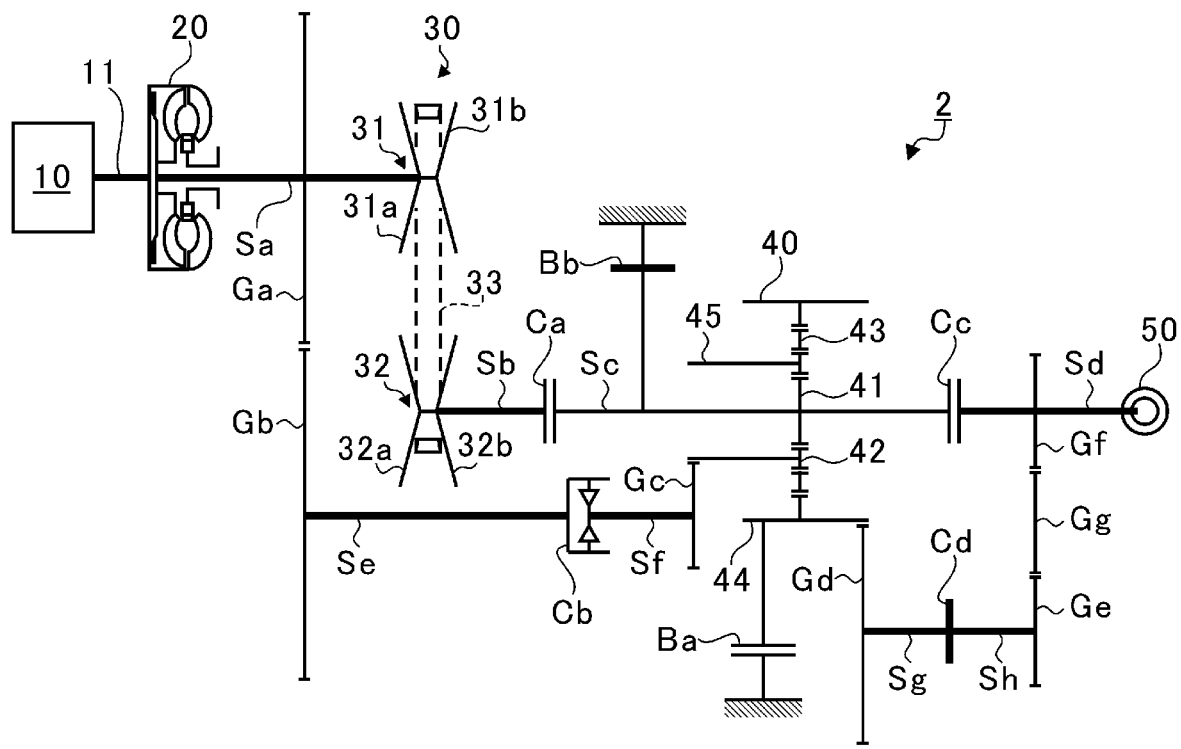
FIG. 5 is a diagram illustrating the transmission apparatus when the vehicle travels backward.

FIG. 5 is a diagram illustrating the transmission apparatus 2 when the vehicle 1 travels backward. As illustrated in FIG. 5, when the vehicle 1 travels backward, the clutch controller 70 makes the first clutch Ca and the third clutch Cc in the disconnected states and makes the fourth clutch Cd in the connected state. The brake controller 80 makes the first brake Ba in the disconnected state and makes the second brake Bb in the connected state.

The power of the first shaft Sa is transmitted through the second path to the carrier 45 and the first planetary gear 42. The second path passes the torque converter 20, the first shaft Sa, the gears Ga and Gb, the fifth shaft Se, and the gear Gc.

At this time, the second brake Bb in the connected state stops rotation of the third shaft Sc and rotation of the sun gear 41. Thus, the power that is transmitted to the first planetary gear 42 is transmitted to the wheel 50 via the ring gear 44 and the fourth path. The fourth path passes the gear Gd, the seventh shaft Sg, the eighth shaft Sh, the gears Ge, Gg, and Gf, and the fourth shaft Sd.

In more detail, the power of the ring gear 44 is transmitted to the seventh shaft Sg via the gear Gd. The fourth clutch Cd in the connected state allows transmission of the power from the seventh shaft Sg to the eighth shaft Sh. The power of the eighth shaft Sh is transmitted to the wheel 50 via the gears Ge, Gg, and Gf and the fourth shaft Sd as power in the reverse rotation.

The power of the first shaft Sa is also transmitted to the second shaft Sb via the continuously variable transmission 30. This causes rotation of the second shaft Sb although the third shaft Sc is stopped, but this causes no problem because the first clutch Ca is in the disconnected state.

The transmission apparatus 2 thus switches between a forward travel state and a rearward travel state by using the planetary gear mechanism 40. This eliminates the need to additionally provide a complicated mechanism for the backward travel, thereby allowing a simple structure.

The ring gear 44 has the lowest rotation speed among the gears of the planetary gear mechanism 40. For this reason, the ring gear 44 is coupled to the fourth path that transmits the power in the reverse rotation direction at the time of backward traveling. In consideration that the rotation speed or the vehicle speed that is required at the time of the backward traveling is low, the above structure eliminates the need to greatly change gears.

Figure 6:
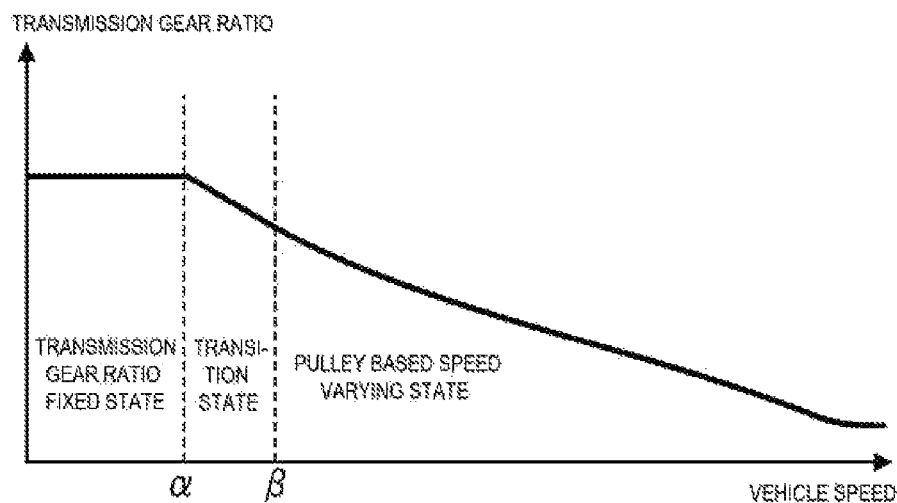
FIG. 6 illustrates an example of changes in a transmission gear ratio in accordance with an increase in the vehicle speed in a mileage priority mode.
Figure 7:
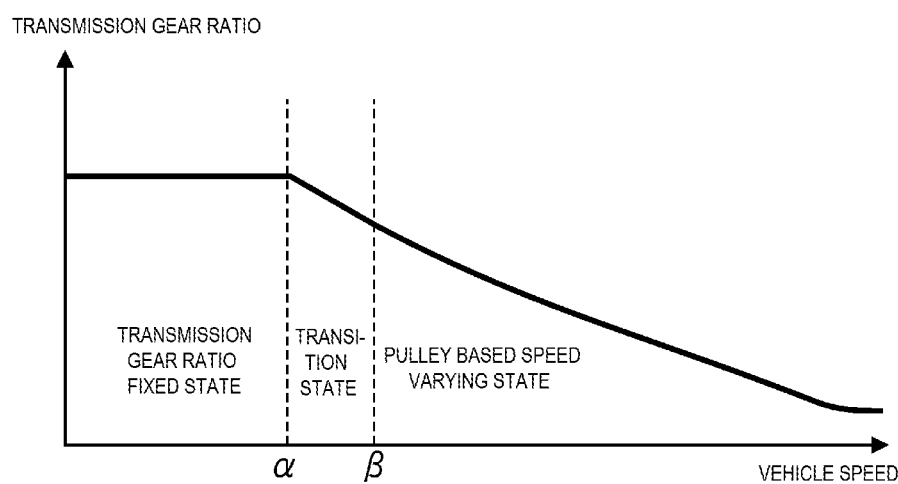
FIG. 7 illustrates an example of changes in the transmission gear ratio in accordance with an increase in the vehicle speed in a normal mode.
Figure 8:
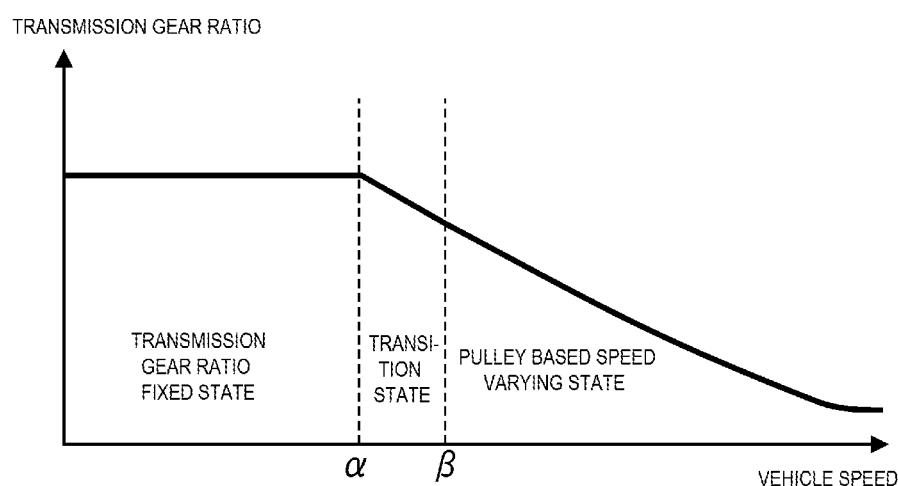
FIG. 8 illustrates an example of changes in the transmission gear ratio in accordance with an increase in the vehicle speed in an acceleration priority mode.

FIG. 6 illustrates an example of changes in a transmission gear ratio in accordance with increase an in a vehicle speed in a mileage priority mode. FIG. 7 illustrates an example of changes in a transmission gear ratio in accordance with an increase in a vehicle speed in a normal mode. FIG. 8 illustrates an example of changes in a transmission gear ratio in accordance with an increase in a vehicle speed in an acceleration priority mode.

The vehicle 1 has the mileage priority mode, the normal mode, and the acceleration priority mode. The mileage priority mode provides high fuel economy, namely, a long travel distance per unit volume of fuel, although the acceleration is low. The acceleration priority mode provides high acceleration, although the fuel economy is low. The normal mode provides fuel economy and acceleration of intermediate levels between the levels of the fuel economy and the acceleration provided in the mileage priority mode and the levels of the fuel economy and the acceleration provided in the acceleration priority mode.

As illustrated in FIGS. 6 to 8, in the transmission gear ratio fixed state in which the vehicle speed is a or less, the continuously variable transmission 30 is not used, and the transmission gear ratio is constant. In this state, the rotation speed of the second shaft Sb is lower than that of the sun gear 41. After the vehicle speed exceeds the vehicle speed α, the clutch controller 70 and the brake controller 80 control to make the transmission apparatus 2 in a transition state.

Figure 9:
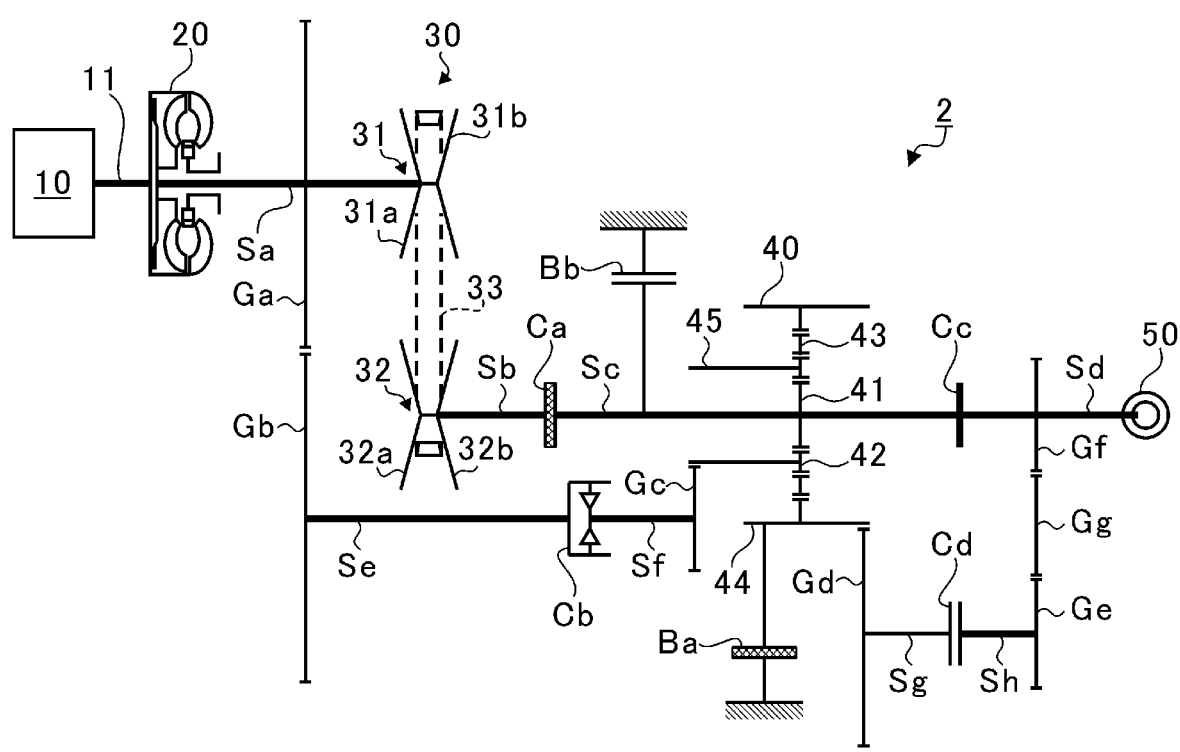
FIG. 9 is a diagram illustrating a transition state of the transmission apparatus.

FIG. 9 is a diagram illustrating the transition state of the transmission apparatus 2. In the transition state, the clutch controller 70 makes the first clutch Ca in the half-clutch state. This half-clutch state is illustrated by a cross-hatching in FIG. 9. The clutch controller 70 gradually brings the first clutch Ca into the connected state. As the connection of the first clutch Ca becomes stronger, the rotation speed A of the third shaft Sc which is provided by power transmitted from the second shaft Sb to the third shaft Sc or the sun gear 41 is made higher.

The brake controller 80 brings the first brake Ba into the half-clutch state. This half-clutch state is illustrated by a cross-hatching in FIG. 9. The brake controller 80 gradually brings the first brake Ba into the disconnected state. As the connection of the first brake Ba becomes weaker, the inhibition of rotation of the ring gear 44 becomes weaker, thereby making it easy for the first planetary gear 42 to idle. Thus, the rotation speed B of the third shaft Sc which is provided by the power transmitted from the sixth shaft Sf side to the third shaft Sc or the sun gear 41 is made lower.

For instance, it is assumed that when the vehicle speed becomes a vehicle speed β, which is higher than the vehicle speed α, the rotation speed A, which is provided by the power from the second shaft Sb in the first path, exceeds the rotation number B, which is provided by the power from the sixth shaft Sf side in the second path. In this situation, the power transmission path is substantially switched from the second path to the first path. Thereafter, the clutch controller 70 makes the first clutch Ca completely connected. The brake controller 80 makes the first brake Ba completely disconnected. Thus, the transmission apparatus 2 is brought into the pulley based speed varying state.

In the transition state, as described above, the rotation speed A, which is provided by the power from the second shaft Sb in the first path, exceeds the rotation number B, which is provided by the power from the sixth shaft Sf side in the second path. At this time, even when the power is transmitted from the third shaft Sc side to the sixth shaft Sf side, the transmission of the power from the sixth shaft Sf to the fifth shaft Se is cut off because the second clutch Cb is the one-way clutch.

The fuel economy in the pulley based speed varying state is lower than that in the transmission gear ratio fixed state. The acceleration in the transmission gear ratio fixed state is higher than that in the pulley based speed varying state.

The clutch controller 70 and the brake controller 80 change thresholds for switching between the transmission gear ratio fixed state and the pulley based speed varying state, depending on which mode is set in the vehicle 1 among the mileage priority mode, the normal mode, and the acceleration priority mode. The thresholds include, for instance, the engine speed, the vehicle speed, and a requested torque.

As a result, as illustrated in FIGS. 6 to 8, the control device 3 performs a control so that a range of the vehicle speed for the transmission gear ratio fixed state is smaller and the range of the vehicle speed for the pulley based speed varying state is larger in the mode that provides higher fuel economy. Conversely, the control device 3 performs a control such that the range of the vehicle speed for the transmission gear ratio fixed state is larger and the range of the vehicle speed for the pulley based speed varying state is smaller in the mode that provides higher acceleration.

The embodiment of the disclosure has been described with reference to the accompanying drawings. It should be noted that examples of the disclosure are not limited to such an embodiment. It is apparent to those skilled in the art would conceive various modifications and changes within the scope of claims. It is understood that these modifications and changes fall within the technical scope of the disclosure.

For instance, the above-described embodiment uses the sun gear 41, the first planetary gears 42, and the ring gear 44 as the first gear, the second gear, and the third gear, respectively. However, any two or three of these gears may be interchanged.

In the above-described embodiment, the fourth path and the second brake Bb are provided for the backward travelling. However, the fourth path and the second brake Bb are not essential components.

The above-described embodiment uses the double pinion planetary gear mechanism for the planetary gear mechanism 40. However, the planetary gear mechanism 40 is not limited to the double pinion planetary gear mechanism. That is, the second planetary gear 43 is not an essential component.

According to the disclosure, it is possible to reduce power loss.

The invention claimed is:

1. A transmission apparatus comprising:
   a planetary gear mechanism comprising a first gear, a second gear, and a third gear;
   a first path configured to transmit power from an output shaft of an engine to the first gear;
   a second path configured to transmit the power from the output shaft to the second gear;
   a continuously variable transmission disposed in the first path;
   a first brake configured to stop rotation of the third gear; and
   a third clutch being configured to switch between a connected state and a disconnected state of the third gear with a wheel.

2. The transmission apparatus according to claim 1, further comprising:
   a first clutch disposed in the first path, the first clutch being configured to switch transmission of the power between the output shaft and the first gear, between a connected state and a disconnected state.

3. The transmission apparatus according to claim 2, further comprising:
   a second clutch disposed in the second path, the second clutch being configured to cut off transmission of power from the second gear side to the output shaft side.

4. The transmission apparatus according to claim 3, wherein
   the first gear comprises a sun gear,
   the second gear comprises a planetary gear, and
   the third gear comprises a ring gear.

5. The transmission apparatus according to claim 2, wherein
   the first gear comprises a sun gear,
   the second gear comprises a planetary gear, and
   the third gear comprises a ring gear.

6. The transmission apparatus according to claim 1, further comprising:
   a clutch disposed in the second path, the clutch being configured to cut off transmission of power from the second gear side to the output shaft side.

7. The transmission apparatus according to claim 6, wherein
   the first gear comprises a sun gear,
   the second gear comprises a planetary gear, and
   the third gear comprises a ring gear.

8. The transmission apparatus according to claim 1, further comprising:
   a third path configured to transmit power from one of the first gear and the second gear to a wheel;
   a fourth path configured to transmit power from the third gear to the wheel, the power being in a rotation direction reverse to a rotation direction of the power that passes through the third path; and
   a second brake configured to stop rotation of one of the first gear and the second gear.

9. The transmission apparatus according to claim 1, wherein
   the first gear comprises a sun gear,
   the second gear comprises a planetary gear, and
   the third gear comprises a ring gear.

10. A transmission apparatus comprising:
    a planetary gear mechanism comprising a first gear, a second gear, and a third gear,
    a first path configured to transmit power from an output shaft of an engine to the first gear,
    a second path configured to transmit the power from the output shaft to the second gear;
    a continuously variable transmission disposed in the first path,
    a first brake configured to stop rotation of the third gear;
    a third path configured to transmit power from one of the first gear and the second gear to a wheel;
    a fourth path configured to transmit power from the third gear to the wheel, the power being in a rotation direction reverse to a rotation direction of the power that passes through the third path; and
    a second brake configured to stop rotation of one of the first gear and the second gear.

11. A transmission apparatus comprising:
    a planetary gear mechanism comprising a first gear, a second gear, and a third gear;
    a first path configured to transmit power from an output shaft of an engine to the first gear,
    a second path configured to transmit the power from the output shaft to the second gear,
    a continuously variable transmission disposed in the first path;
    a third path configured to transmit power from one of the first gear and the second gear to a wheel;
    a fourth path configured to transmit power from the third gear to the wheel, the fourth path including a third clutch being configured to switch between a connected state and a disconnected state with the wheel; and a brake configured to stop rotation of one of the first gear and the second gear.

\* \* \* \* \*